United States Patent [19]

Pilley

[11] Patent Number: 5,574,648
[45] Date of Patent: *Nov. 12, 1996

[54] AIRPORT CONTROL/MANAGEMENT SYSTEM USING GNSS-BASED METHODS AND EQUIPMENT FOR THE CONTROL OF SURFACE AND AIRBORNE TRAFFIC

[76] Inventor: Harold R. Pilley, R.F.D. #1, Box 204, Deering, N.H. 03244

[ * ] Notice: The portion of the term of this patent subsequent to Apr. 6, 2010, has been disclaimed.

[21] Appl. No.: 369,273

[22] Filed: Jan. 5, 1995

Related U.S. Application Data

[63] Continuation of Ser. No. 859,681, Jun. 9, 1992, abandoned, which is a continuation-in-part of Ser. No. 758,852, filed as PCT/US91/07575 Sep. 10, 1991, abandoned, which is a continuation-in-part of Ser. No. 593,214, Oct. 9, 1990, Pat. No. 5,200,902.

[51] Int. Cl.$^6$ .................................................. G06F 163/00
[52] U.S. Cl. .......................... 364/439; 364/449; 340/945; 340/990; 342/36; 342/456
[58] Field of Search ..................... 364/428, 427, 364/439, 440, 441, 443, 449, 460, 461; 342/36, 38, 454, 455, 456; 340/947, 951, 953, 988, 989, 990, 995, 945; 73/178 R, 178 T

[56] References Cited

U.S. PATENT DOCUMENTS

| | | | |
|---|---|---|---|
| 3,668,403 | 6/1972 | Meilander | 342/36 |
| 3,706,969 | 12/1972 | Paredes | 340/989 |
| 3,731,312 | 5/1973 | Kurkjian | 342/456 |
| 3,855,571 | 12/1974 | Massa | 340/990 |
| 3,875,379 | 4/1975 | Vietor | 364/440 |
| 3,882,497 | 5/1975 | Klass et al. | 342/455 |
| 4,516,125 | 5/1985 | Schwab et al. | 342/36 |
| 4,660,037 | 4/1987 | Nakamura | 340/990 |
| 4,661,811 | 4/1987 | Gray et al. | 340/995 |
| 4,706,198 | 11/1987 | Thurman | 364/439 |
| 4,811,230 | 3/1989 | Graham et al. | 364/428 |
| 4,827,418 | 5/1989 | Gerstenfeld | 364/439 |
| 4,890,232 | 12/1989 | Mundra | 364/439 |
| 4,890,233 | 12/1989 | Ando et al. | 340/995 |
| 4,949,267 | 8/1990 | Gerstenfeld et al. | 364/439 |

(List continued on next page.)

FOREIGN PATENT DOCUMENTS

| | | |
|---|---|---|
| 0379198 | 7/1990 | European Pat. Off. . |
| 2165427 | 4/1986 | United Kingdom . |

Primary Examiner—Collin W. Park
Attorney, Agent, or Firm—George W. Dishong

[57] ABSTRACT

An improved airport control/management system for controlling and managing the surface and airborne movement of vehicular and aircraft within a defined and selected airport space envelope of an airport, the traffic, comprising apparatus for establishing a precise 3-dimensional digital map of the selected airport space envelope, the map containing GNSS positioning system reference points, a computer with a monitor screen for receiving and displaying the 3-dimensional map, transmit and receive radio equipment located on at least one vehicle/aircraft in the airport space envelope to generate and transmit continuous GNSS-based location reports a receiver associated with the computer to receive the reports from the vehicle/aircraft, programming associated with the computer and using the reports to superimpose 3-dimensional image corresponding to a path of the vehicle/aircraft onto the 3-dimensional map, apparatus associated with the 3-dimensional map for generating airport control and management signals as a function of the vehicle/aircraft path and computer aided design programming for manipulation of the 3-dimensional map and the image of the vehicle/aircraft and the path to a desired apparent line of observation, to control the traffic in the airport, the improvement comprising: the layering of the airport map creating a layered airport map having at least one layer, the layering permitting thereby sorting and tracking of each of the vehicle/aircraft, each of the layers selected from the group determined by function consisting of air traffic control phase of flight, notams, forbidden zone identification, airline and airport operations. The invention may also include systems and apparatus for identifying the type of vehicle and the 3-dimensional orientation of same.

45 Claims, 9 Drawing Sheets

U.S. PATENT DOCUMENTS

| | | | |
|---|---|---|---|
| 4,975,696 | 12/1990 | Salter, Jr. et al. | 340/990 |
| 4,979,137 | 12/1990 | Gerstenfeld et al. | 364/439 X |
| 5,025,382 | 6/1991 | Artz | 364/439 |
| 5,089,816 | 2/1992 | Holmes, Jr. | 340/995 |
| 5,111,400 | 5/1992 | Yoder | 364/424.01 |
| 5,200,902 | 4/1993 | Pilley | 364/439 |
| 5,216,611 | 6/1993 | McElreath | 364/428 X |
| 5,252,978 | 10/1993 | Priestley | 342/38 X |

TAXI FROM STEAD TO 24 FOR TAKE OFF
VELOCITY (KNOTS) & ALTITUDE/10 (FEET) VERSUS TIME

HARDWARE SYSTEM COMPONENTS

SOFTWARE SYSTEM COMPONENTS

AIRCRAFT-VEHICLE HARDWARE
SYSTEM COMPONENTS

AIRPORT CONTROL/MANAGEMENT SYSTEM USING GNSS-BASED METHODS AND EQUIPMENT FOR THE CONTROL OF SURFACE AND AIRBORNE TRAFFIC

This application is a continuation, of application Ser. No. 07/859,681, filed Jun. 9, 1992 now abandoned, which is a continuation-in-part of U.S. patent application Ser. No. 07/758,852 filed as PCT/US91/07575 on Sep. 10, 1991, now abandoned, which in turn is a continuation-in-part of U.S. patent application Ser. No. 07/593,214 filed on Oct. 9, 1990 now U.S. patent No. 5,200,902 which issue on Apr. 6, 1993.

BACKGROUND OF THE INVENTION

One of the major problems facing the world today is the fact that airplane travel has increased tremendously, while the airport facilities have not. Attempts to expand present airports and to build new ones have met with considerable resistance... not only because of aesthetic factors, but also simply because there is now no inexpensive land adjacent to the large cities.

Because it appears, therefore, difficult to meet increased air traffic demands by increasing airport facilities, it is obvious that a solution to the problem may lie in allowing a given airport to make more intensive use of its facilities. The limit to such a solution lies in the necessity to maintain satisfactory safety standards. Safety plays an important role in the accuracy and limits of present day surveillance systems, as well as flight dynamics for individual aircraft. Technological advances in aircraft, such as STOL, tilt rotor, and rotary wing, will enable the Terminal Control Area (TCA) to handle increased traffic loads without increasing the surface tarmac significantly.

The present airport control systems rely heavily on a radar display screen that shows the location of aircraft in flight in a two dimensional format; the individual planes are labelled for altitude and other factors; unfortunately, much of the work involves visual observation through the control tower window and verbal communication.

Considerable work has been done recently in attempts to improve airport traffic control. The patent of MUNDRA No. 4,890,232, for instance, has to do with a visual display apparatus for showing the relationship of two separate aircraft on converging runways. The patent of GERSTENFELD, No. 4,827,418, describes an expert system for training control operators. The patent of GRAHAM et al., No. 4,811,230, shows a flight management computer that includes an intervention system. The patent of THURMAN, No. 4,706,198, describes a computerized airspace control system invoking a master control system and regional control units. A patent to SCHWAB et al., No 4,516,125, shows apparatus for monitoring vehicle ground movement in the vicinity of an airport and involves the processing of radar return video signals. The patent of LOMAX et al., No. 4,075,666, shows a magnetic tape recorder for use in the continuous televising of air traffic control radar. The patents of VIETOR, Nos. 3,875,379; 3,868,497; and 3,758,765, have to do with terminal airways traffic control; a ground-based computer issues speed commands. The patent of MASSA, No. 3,855,571, describes an aircraft traffic control system involving a sound generator on each airplane that reaches selected microphones along its ground path, the signals thus received operating on a display panel in the form of a map. A patent of FELLMAN, No. 3,787,056, relates to a game device for simulating aircraft traffic control and teaching the rules of traffic control. The patent of KURKJIAN, No. 3,731,312, has to do with an air traffic control system utilizing rotating radial signals. In all of these cases, the airport controller lacks sufficient information to handle large amounts of aircraft landing and taking off, particularly when mixed with service vehicles on the ground. A great deal of the safety of these systems depends on the visual and verbal information that the control personnel picks up and this information is subject, of course, to the fallibility of the human mind. These and other difficulties experienced with the prior art devices and systems have been obviated in a novel manner by the present invention.

It is, therefore, an outstanding object of the invention to provide a cost-effective airport control/management system for vehicles which are operating in 3-dimensional space.

Another object of this invention is the provision of a control/management system, especially for aircraft control, in which a 3-dimensional display is produced to show the information necessary to operate an airport.

A further object of the present invention is the provision of a means for handling increased traffic at an airport without loss of safety.

A still further object of the invention is the provision of a system for superimposing a 3-dimensional display of local aircraft paths on an accurately-configured map of the local space.

It is a further object of the invention to provide an airport traffic control system which will permit an increase in airport capacity and safety, while allowing the airport to remain within present territorial boundaries.

Another object of the invention is the provision of an improved surveillance system for airport arrival and departure aircraft separation.

Another object of the invention is the provision of an airport control/management system that is suitable to the task of providing for increased traffic, while maintaining safety; that will enjoy a wide and growing market acceptance with declining life cycle costs; and that will integrate easily with other parts of the air traffic control and aircraft navigation systems.

With these and other objects in view, as will be apparent to those skilled in the art, the invention resides in the combination of parts set forth in the specification and covered by the claims appended hereto.

SUMMARY OF THE INVENTION

In general, the present invention is an airport control/management system which has a means for establishing a precise 3-dimensional digital map of a selected airport space envelope, the map containing global positioning system reference points. A computer with a monitor screen is provided for receiving and displaying the 3-dimensional map. Means is provided that is located on at least one vehicle in the airport space envelope to receive continuous global navigation satellite system (GNSS) signals, calculate position, velocity, heading, and time and transmitting the information to a receiver associated with the computer. Means is provided within the computer to display a 3-dimensional image corresponding to the vehicle path on the 3-dimensional map.

More specifically, the global navigational satellite system includes a constellation of space satellites and the computer contains a program for manipulating the image of the vehicle path and the map together to a desired apparent line of observation.

BRIEF DESCRIPTION OF THE DRAWINGS

This invention most generally is a system and a method for the control of surface and airborne traffic within a defined space envelope. GNSS-based, or GPS-based data is used to define and create a 3-dimensional map define locations, to compute trajectories, speeds, velocities, static and dynamic regions and spaces or volumes (zone) including zones identified as forbidden zones. Databases are also created, which are compatible with the GNSS data. Some of these databases may contain, vehicle information such as type and shape, static zones including zones specific to vehicle type which are forbidden to the type of vehicle, notice to airmen (notams) characterized by t h e information or GNSS data. The GNSS data in combination with the data bases is used, for example, by air traffic control, to control and manage the flow of traffic approaching and departing the airport and the control of the flow of surface vehicles and taxiing aircraft. All or a selected group of vehicles may have GNSS receivers. Additionally, all or a selected group may have bi-directional digial data and voice communications between vehicles and also with air traffic control. All of the data is made compatible for display on a screen or selected screens for use and observation including screens located on selected vehicles and aircraft. Vehicle/aircraft data may be compatibly superimposed with the 3-dimensional map data and the combination of data thus displayed or displayable may be manipulated to provide selected viewing. The selected viewing may be in the form of choice of the line of observation, the viewing may be by layers based upon the data and the objective for the use of the data.

The invention, may be best understood by reference to one of its structural forms, as illustrated by the accompanying drawings, in which.

DESCRIPTION OF THE PREFERRED EMBODIMENT

Figure 1:
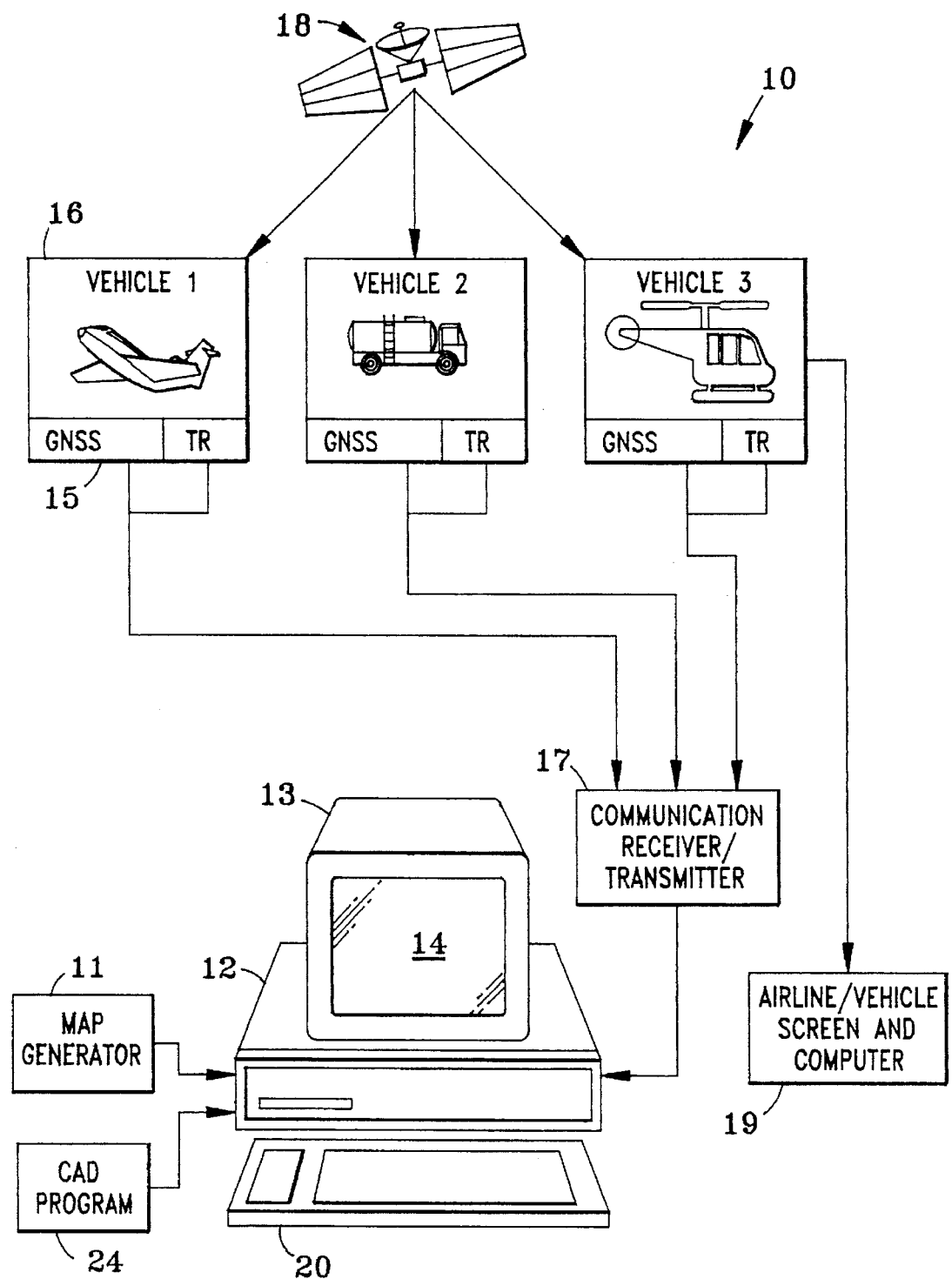
FIG. 1 is a generally schematic view of an airport control/management system incorporating the principles of the present invention.

Referring first to FIG. 1, which best shows the general features of the invention, the airport control/management system, indicated generally by the reference numeral 10, is shown as including a map generator 1 for establishing a precise 3-dimensional digital map of a selected airport space envelope. The map contains global positioning system reference points. The system includes a computer 12 having a monitor 13 with a screen 14. The computer and screen serve to receive and display the 3-dimensional map.

A GNSS receiver 15 is located in a vehicle 16 (#1), which is located in the airport space envelope. The GNSS receiver calculates the position, velocity, time and heading, possibly using reference station corrections. These signals are transmitted to a receiver 17 which, in turn, is connected to the computer 12. The computer contains a program to use the said signals to superimpose a 3-dimensional image corresponding to the vehicle path onto the 3-dimensional map.

The GNSS receiver incorporated in the vehicles contains, in the usual way, access to space satellites 18. The computer 12 contains a computer-aided-drawing (CAD) program 24 that is capable of manipulating the image of the vehicle path and the map to a desired apparent point of observation. A secondary screen 19 may be provided at a suitable airline facility, to show the location and movement of the airline's own vehicle (#3, for instance).

Figure 2:
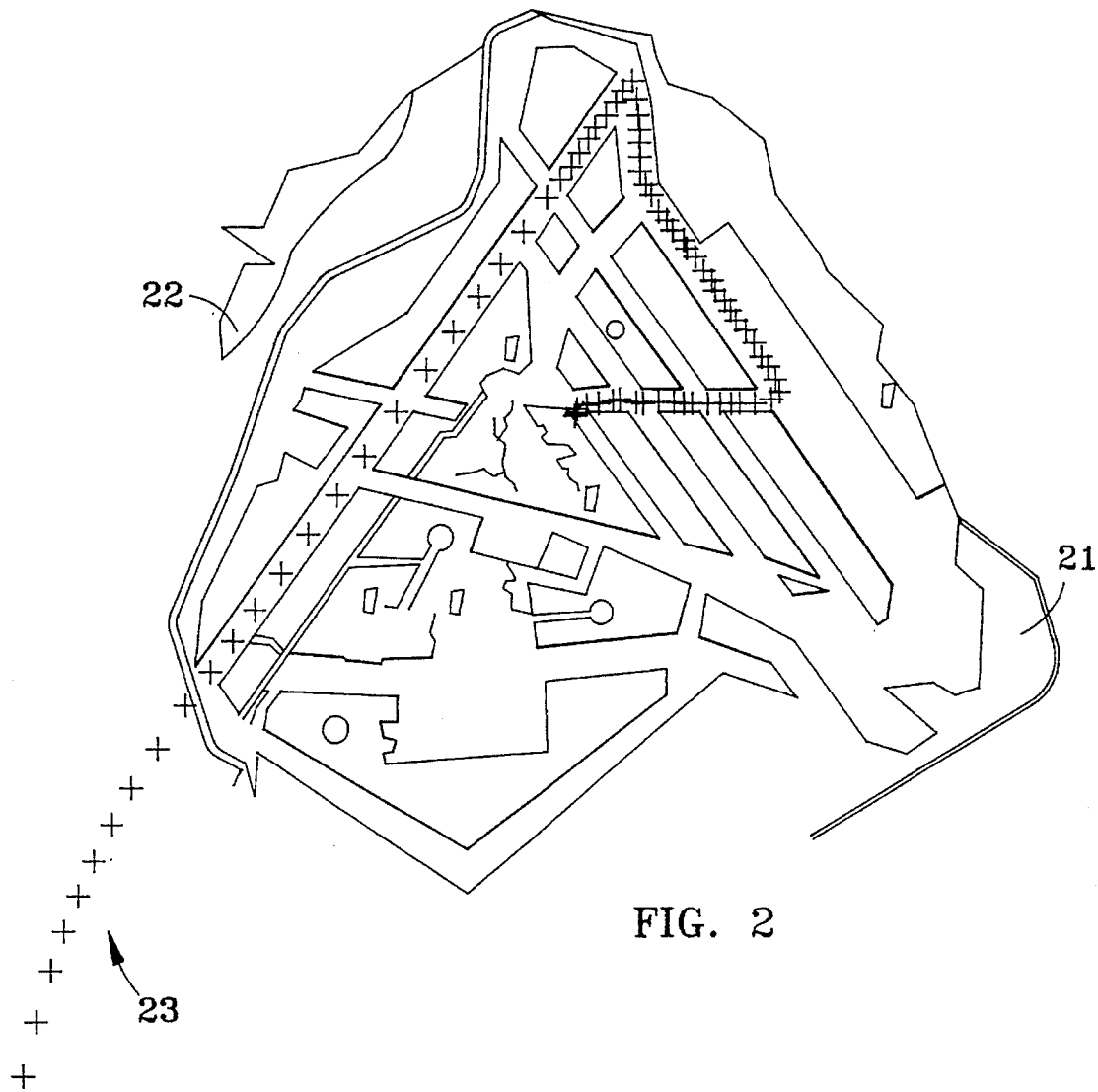
FIG. 2 is a plan view of an airport with a vehicle path imposed, as it appears on a computer screen in the system.

FIG. 2 shows the image 21 as it appears on the monitor screen 14 when the 3-dimensional map 22 of the airport (generated by the generator 11) has the path 23 of a vehicle, such as vehicle #1, imposed upon it. This is a plan view in which the airport map is shown as it appears from directly above and as the vehicle path appears from the same vantage point. The term "airport" can, of course, include not only conventional land-based airports, but also vertiports, heliports, and sea bases.

Figure 3:
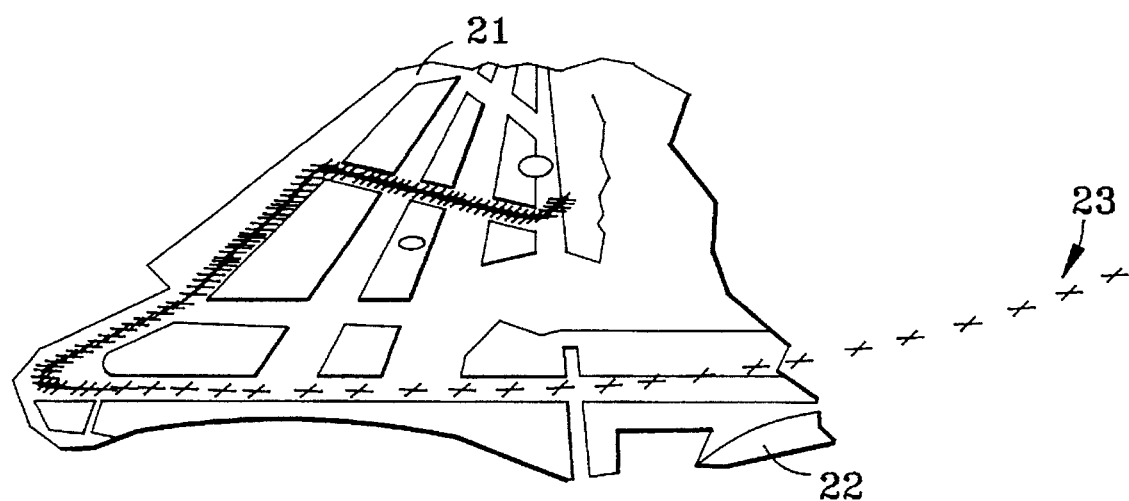
FIG. 3 is a view of the airport and vehicle path as it appears on the screen with a 20-degree viewing angle.

FIG. 3 shows the appearance of the screen 14 when the computer aided drawing program 24 is used to rotate the image to an aspect which is 20 degrees out of the horizontal. In both FIGS. 2 and 3, the vehicle is shown in the taxi to take-off mode, but, of course, the appearance would be somewhat similar if it were in the landing mode.

The operation and advantages of the invention will now be readily understood in view of the above description. The method of establishment of a precise 3-dimensional digital map 22 is well-known and makes use of photogrammetry and stereoscopic digitalization techniques. The digital information contained in the map generator 11 is then applied through the computer 12 to the screen 14. At that time, the map 22 appears on the screen and the resulting image-can be manipulated by use of the computeraided drawing program 24 to show the appearance of the airport space envelope as it appears from any desired angle and at any distance. This manipulation is controlled by means of a keyboard 20, other standard input device, such as a mouse or tablet, or resident applications software.

The next step consists of receiving GNSS signals, using an antenna designed for this purpose. The on-board receiver on the aircraft 16 performs the necessary calculations and then transfer the results using a transmitter 15 within the vehicle. The equipment makes use of satellites 18 whose position relative to the earth's center of mass is precisely known. The transmitter 15 sends information as to the aircraft's location, speed, heading, identification and time of transmission to the receiver 17 and this is presented to the computer 12 for display on the screen 14. The information thus transmitted generates an image 21 on the screen which represents a three-dimensional picture of the vehicle path 23 superimposed on the map 22. The image 21 thus produced can be rotated by the CAD program 24 to any desired angle and zoomed to enlarge or decrease the size.

Figure 4:
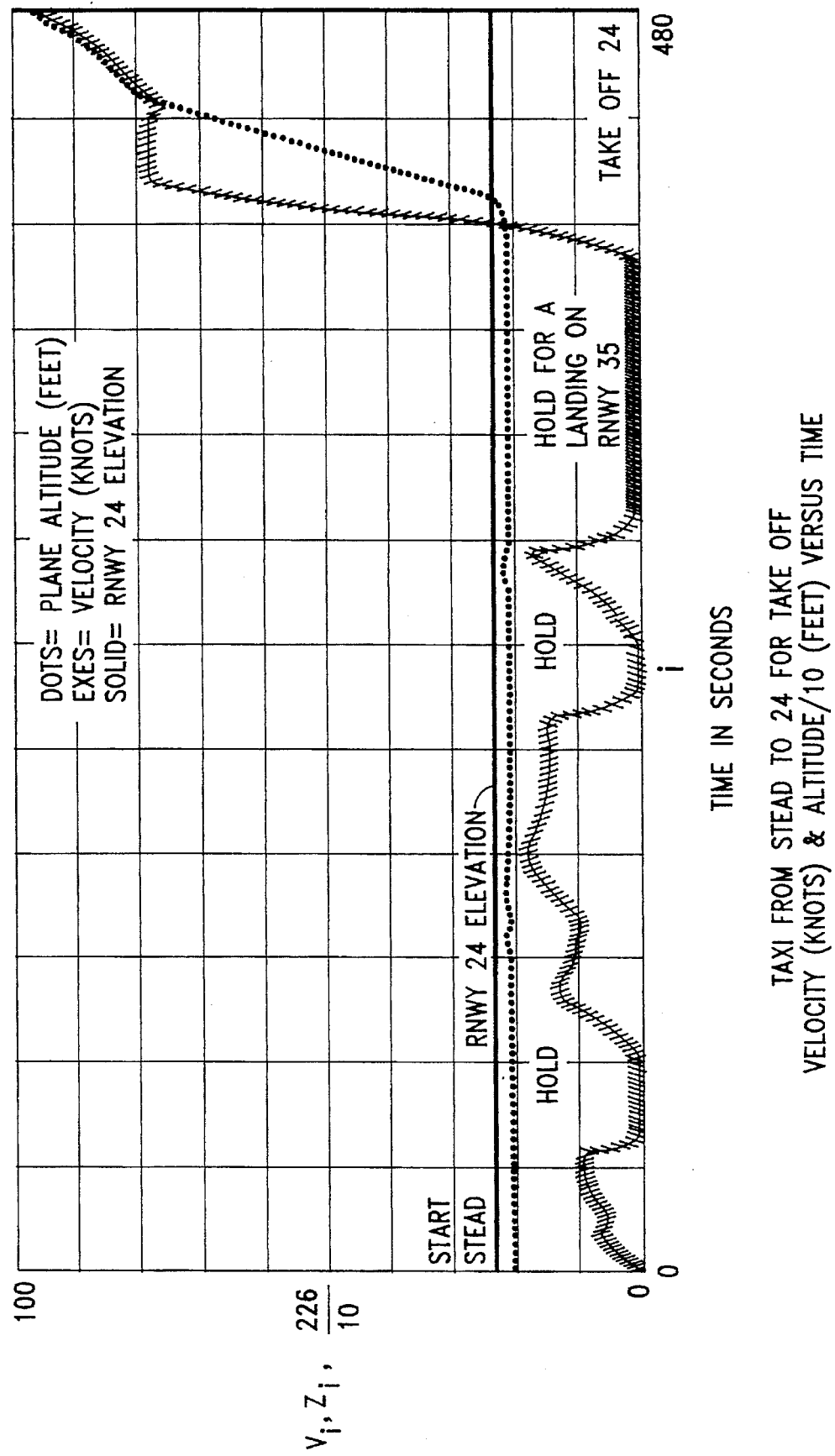
FIG. 4 is a diagram showing the pattern generated by the vehicle in take-off mode.

FIG. 2 shows the appearance of the image 21 in plan, i.e., as the airport and aircraft path appear when viewed from directly. above. FIG. 3 shows the image when the observation angle is 20 degrees above the horizontal. It can be seen, then, that an accurate visualization of the vehicle's progress is made possible by selecting various angles of view, as desired. For instance, the chart of FIG. 4 shows a typical elevation profile of an aircraft as it moves about the airport preparatory to taking off and then as it takes off. The image 21 can, of course, be transmitted and displayed on other screens; for instance, the screen 19 is located in the facilities of an airline whose vehicle #3 is within the airport space envelope. Since that airline may only be interested in its own vehicle, their screen image may show only that vehicle, or, if desired, may show the same complete image (with other vehicles that is shown on the main screen 14). Similarly, the image 21 can also be displayed on a screen in the aircraft or other airport vehicle. Again, the screen image may show only that vehicle or, if desired, the same or another image that is shown on the main screen 14.

It can be seen, then, that the present inventive system provides an integrated airport planning and design tool. It incorporates available technologies of the type that will play an important future role in aviation navigation and air traffic control.

Air transportation is expected to grow at a large rate in the next few years. The predicted growth will place a substantial load on existing airports. Present airports will need to be modernized to support such growth. Building new runways and buildings is expensive and sometime difficult politically. A better method of improving airport capacity and safety may be from improved automation and modernization. Automation and modernization can be a viable method of increasing capacity and safety, while the airports remain within present territorial boundaries.

The present invention, therefore, serves to satisfy three primary objectives. The three objectives are: (a) suitability for the task, (b) a wide market acceptance with declining life cycle costs, and (c) ability to integrate easily with other parts of the air traffic control and aircraft navigation systems.

In a practical embodiment of the invention, the computer used was a personal computer with 3-D graphics. It was based on a 386 chip operating at 33 MHZ with a 12 MB 80 NS RAM and 387 co-processor. The global position system was the NAVSTAR GPS utilizing earth centered, earth fix (ECEF) coordinates and using the ECEF world geological survey (WGS-84) which was ellipsoid-adjusted for geoid separation. The separation was −28.3 meters mean sea level (MSL) elevation at Manchester, N.H. and used in the 3-D map converted between latitude/longitude and N.H. state plane and other coordinates. The computer used the MSDOS operating system or SCO XENIX OS operating system with modem capability.

In addition to the basic system described above, a great many other features can be added to the system of 3-D airport maps for air traffic control and navigation.

Another feature of the system involves having the airport map arranged in layers for target sorting and tracking. Each layer could be specified for particular function such as air traffic control, airline or airport operations. The system operator could select one or more layers to be displayed. In this way, only information relevant to his present function would be displayed.

Another feature of the system involves the use of precise multi-monumented survey points in airport area for local coordinate conversions and real time map displays.

Another feature of the system is the concept of forbidden zones (areas off limits) based on latest notice to airmen information (notams). These zones are created in the map data base, then used in navigational algorithms. Warnings are generated to the pilot and/or the air traffic controller when the airplane is in or approaching a zone. A forbidden zone can be around two potentially colliding aircraft.

Another feature of the system is the use of a digital data link for automatic dependent surveillance (ADS-radar free surveillance) in the terminal controller area. The system preferably uses X.25 carrier sense multiple access (CSMA) digital communications using frequency division multiplexing (FDM). This technique uses the existing VHF aeronautical spectrum or other available RF Spectrum.

The data radios used in the practical embodiment of the invention featured 25 kilohertz channel spacing versus the 50 kilohertz spacing still in use today. Recently the Federal Communication Commission (FCC) delayed the date when 25 KHz channel spacing will be required for all aviation users until 1997. The aeronautical VHF band operates at frequencies from 118 MHz to 136.975 MHz, giving a total of 760 channels based on 25 KHz channel spacing. Since spectrum is not infinite, sensible use is necessary. The following model is used to provide insight into possible system capacity and operational tradeoffs.

DATA LINK ASSUMPTIONS

1. Traffic control area air and ground targets transmit position to tower air traffic controller.
2. The data link is full duplex over two channels, to and from the aircraft and control tower air traffic control facility.
3. Non-moving aircraft will report positions only once per minute or upon tower interrogation.
4. Moving aircraft will broadcast position once per second on approach and departure otherwise every two seconds or upon interrogation.
5. Use of voice communications will be minimized and restricted to use on selected channels.
6. Radio frequency transmission rate is typically 4800 baud.
7. Carrier Sense Multiple Access X.25 transmission connection, error detection overhead and packet collisions reduce effective RF bw to 1200 baud.
8. Frequency agile (scanning) radios are used with 760 channels.
9. Selected channels are dedicated to tower broadcasts (ATIS, interrogation, differential corrections, etc.).
10. During data collisions, the "capture effect" will allow the strongest transmission to get through, naturally filtering out unwanted signals from aircraft far outside the traffic control area.
11. If a particular channel is saturated, the ADS message handler automatically retransmits on another available channel.
12. Integrity is handled in the GPS receiver with one of the developing techniques.
13. Time of transmission.

Each aircraft broadcasts its ADS message as defined above. The message consists of the following data:

ATC system is based on ECEF positions, only maps are in surface coordinates.

(13) TYPICAL MESSAGE

| | |
|---|---|
| ID# | 8 Characters |
| Current Position: | |
| ECEF X Position (M) | 10 Characters |
| ECEF Y Position (M) | 10 Characters |
| ECEF Z Position (M) | 10 Characters |
| ECEF X2 Position (M) | 2 Characters * |
| ECEF Y2 Position (M) | 2 Characters * |
| ECEF Z2 Position (M) | 2 Characters * |
| ECEF X3 Position (M) | 2 Characters * |
| ECEF Y3 Position (M) | 2 Characters * |
| ECEF Z3 Position (M) | 2 Characters * |
| ECEF X Velocity (M/S) | 4 Characters |
| ECEF Y Velocity (M/S) | 4 Characters |
| ECEF Z Velocity (M/S) | 4 Characters |
| Next waypoint (where headed information): | |
| ECEF X | 10 Characters |
| ECEF Y | 10 Characters |
| ECEF Z | 10 Characters |
| Time | 6 Characters (hhmmss) |
| Total Characters/Message | 98 Characters |

The asterisks identify optional fields for designating and determining vehicle attitude in 3-D digital map data base.

Figure 5:
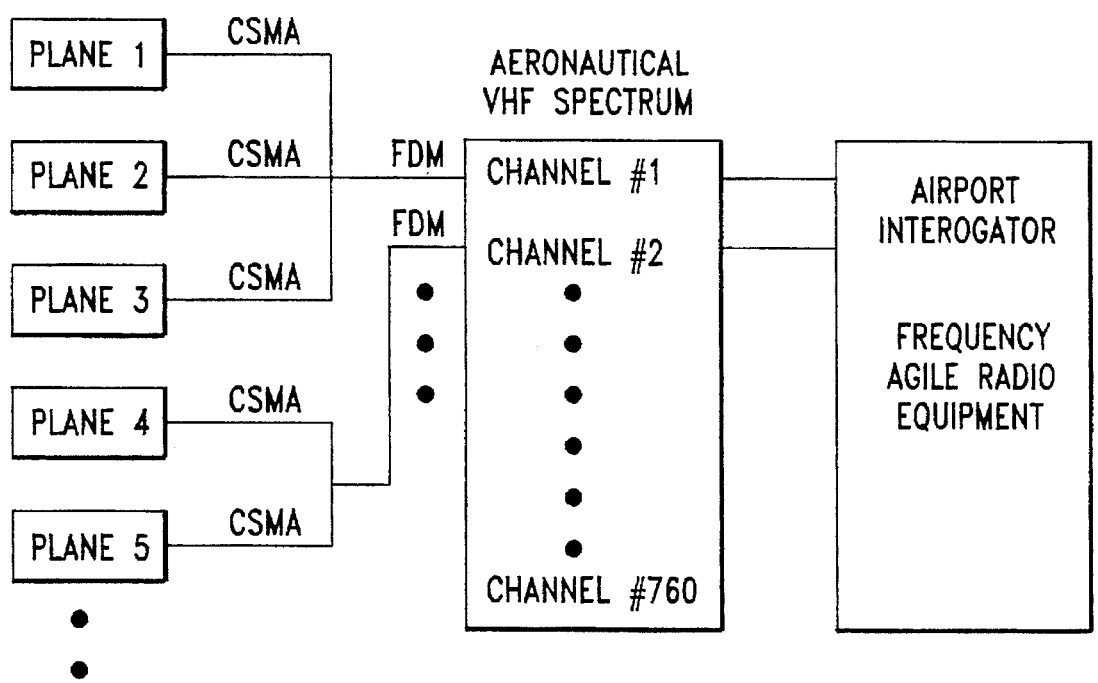
FIG. 5 shows a block diagram of a radio-based data link system which embodies the principles of the present invention.

FIG. 5 shows a block diagram of a radio-based data link system which embodies the principles of the present invention. As described above, in this bi-directional communication system, each airplane tries to get a connection on a particular channel, using the X.25 protocol. If an airplane is unable to use that channel within a predefined period of time, the airplane tries another randomly selected channel (FDM). This technique maximizes use of the available radio frequency spectrum and automatically adjusts to traffic load.

Another feature of the system is use of carrier sense multiple access bi-directional data link for tower to aircraft communication.

Another feature of the system is use of earth centered, earth fixed (ECEF) navigation on the airport surface, and in the terminal airspace.

Another feature of the system is use of three GPS antennas to determine aircraft attitude. Attitude of aircraft is then used to draw the aircraft in the 3-D digital map with the proper attitude. Antennas are placed at three known positions on the aircraft. The GPS positions are then used as handles to draw the aircraft into the 3-D map.

Another feature of the system is that the data link supports three ECEF positions in the data message, so the airplane can be shown at the proper attitude in the 3-D airport map presentation. Therefore, this information is provided in the data link message.

Another feature of the system is automatic dependent surveillance (ADS) transmission broadcast rate which is programmed to the phase of flight. Thus, the data transfer rate varies, depending on the data rate needed for the airplane's present activity. For example, an aircraft which is not moving or is not occupied would transmit once every 60 seconds, an aircraft which is taxiing would transmit every 2 seconds, and an aircraft which is on approach or departure would transmit every second. This maximizes available bandwidth of aeronautical spectrum because each airplane would transmit at a minimum rate which is required at that phase of its flight. Reporting rates may be easily modified as conditions warrant.

Another feature of the system is the construction of a position keyed data base which maintains the last position an aircraft reported. When a plane taxis to a parking location, the data base maintains the plane's position when and after the aircraft is turned off. When the plane is used again and starts to move, the data base is updated with new position data. In this manner, the data base will be self loading and will eventually contain all aircraft in the airport. This concept is extensible to airport surface vehicles such as fuel trucks and buses.

Another feature of the system is the use of precise velocity and acceleration information, derivable from GNSS navigation and position information, as inputs into collision projection algorithms based on the earth centered, earth fixed reference.

Another feature of the system is the use of a multi-windowed display showing different sections or views of the airport in each window.

Another feature of the system is the ability to use map layers and zones of the map to segregate information into various air traffic controllers' stations.

Another feature of the system is the use of a position keyed aircraft data base to automatically filter aircraft. This would be performed using GPS position, the ADS data link, and the ground computer data base.

Another feature of the system is man-machine interface capability in which the controller defines a departure and/or approach trajectory (air and surface) using the data entry device and 3-D airport map, or calls up a previously defined trajectory. The path contains waypoints, notam data and forbidden zone information. The information is drawn into the map and then waypoints are passed to the aircraft as part of ATC clearance. The air traffic control system matches the present position and the next on-board waypoint with stored trajectory data in air traffic control computer. An alarm is sounded if a preset threshold or deviation is exceeded, meaning the aircraft is off course.

Further disclosure: FIGS. 6–10.

Figure 6:
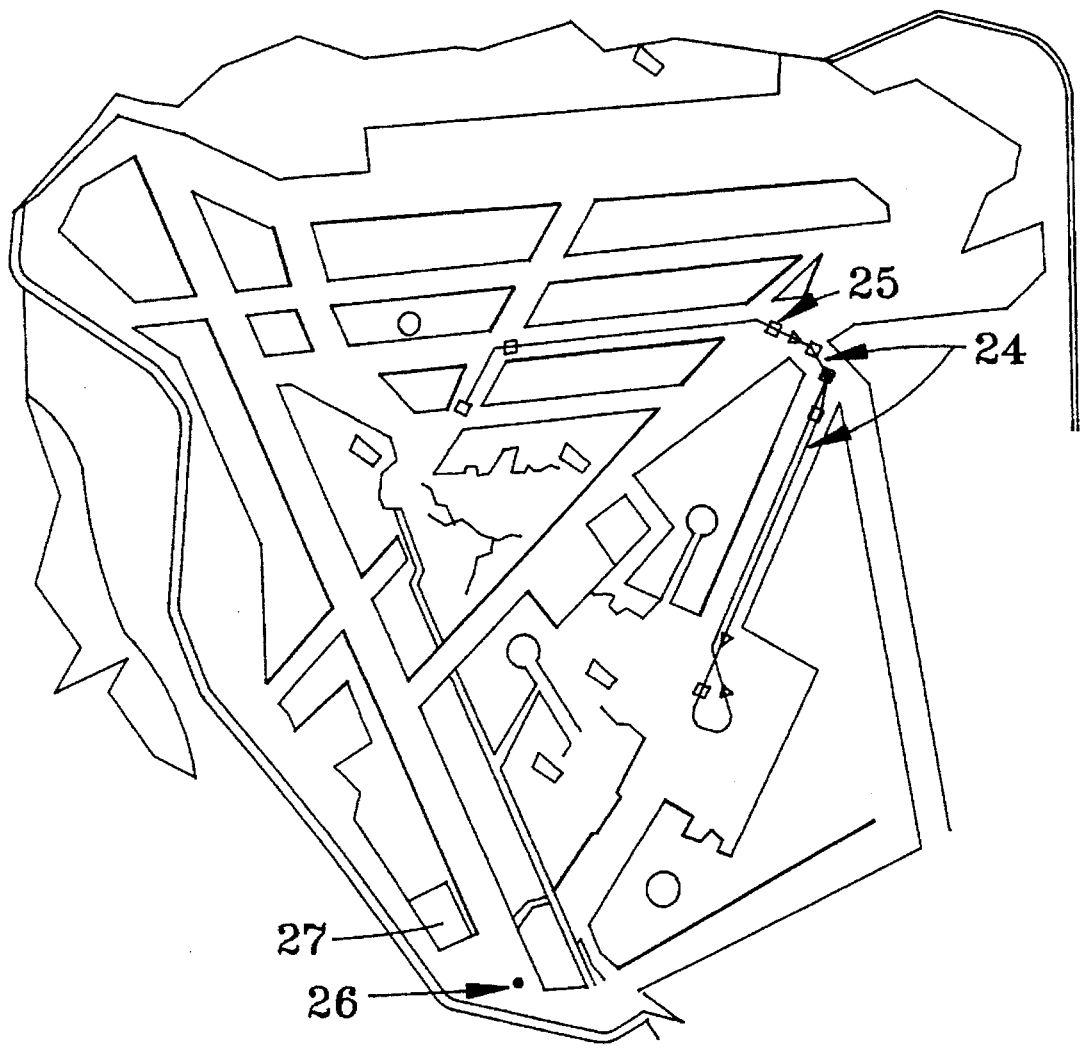
FIG. 6 is a plan view of an airport with a trajectory path, waypoints and monumented survey points imposed, as it appears on a computer screen in the system, FIG. 7 describes the airport terminal system hardware components which embodies the hardware principles of the present invention, FIG. 8 describes the airport terminal system software components which embodies the software principles of the present invention, FIG. 9 describes the aircraft/vehicle system's hardware components which embodies the hardware principles of the present invention, FIG. 10 describes the aircraft/vehicle system's software components which embodies the software principles of the present invention.

FIG. 6 shows the appearance of the screen 14 when a trajectory path 24, waypoints 25 and monumented survey points 26 are imposed on the digital map. In FIG. 6, the trajectory path is shown for a taxiing maneuver, but, of course, the appearance would be somewhat similar for other taxi maneuvers as well as take off and landing trajectories. FIG. 6 also shows the appearance of the screen 14 when a forbidden zone 27 is imposed on the digital map.

Figure 7:
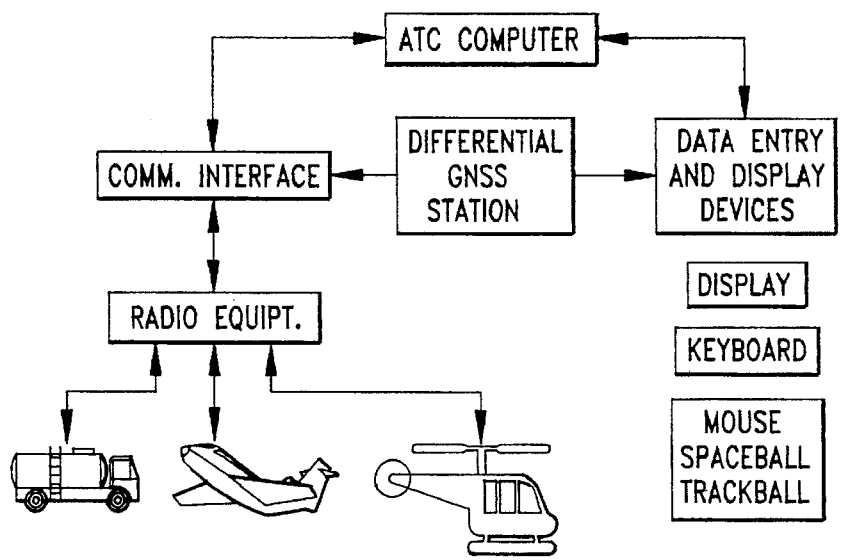

FIG. 7 shows the major hardware components of the airport terminal control system. For each vehicle 28 equipped with a GNSS receiver and transmitter, a GNSS message is transmitted via the vehicle's radio equipment 29 through the communication interface 30 to the ATC computer 32. The signals may include differential corrections broadcast by a differential base station 31. The computer operator has access to a variety of data entry devices 33 including, but not limited to, a keyboard 35, mouse, spaceball or trackball 36 to control the presentation on the computer display screen 34.

Figure 8:
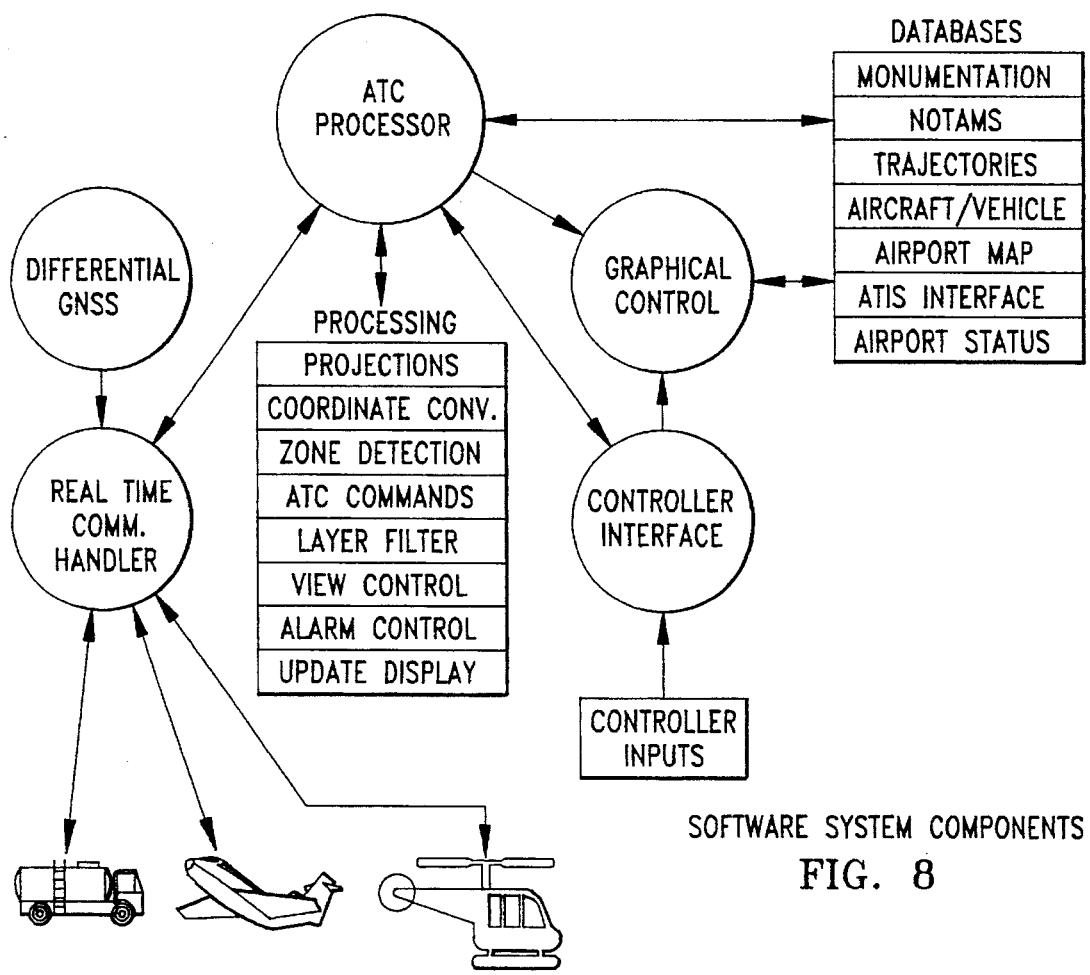

FIG. 8 shows the major software components of the airport terminal control system. The GNSS signals broadcast by the vehicles 37 and the differential corrections determined by the differential GNSS software 39 are processed by the Real Time Communication Handler 38 and sent to the ATC Processor 40. The ATC Processor uses the GNSS data to perform the following processing functions listed under item 41: projections, coordinate conversions, zone detection, layer filter, view control, alarm control and display updates. The ATC Processor software 40 also receives inputs from the Controller Interface 43 software. The Controller Interface uses the data received by the controller's inputs 44 to compose ATC commands which are sent to the ATC Processor 40 for processing. Commands affecting the presentation on the computer display screen 34 are sent by either the ATC Processor 40 or Controller Interface 43 to the Graphical Control 42 software. Both the ATC Processor and Graphical Control 42 software use the Monumentation, NOTAMS, Trajectories, Aircraft/Vehicle, Airport Map, ATIS Interface and Airport Status data bases 45 to manipulate the presentation on the computer display screen 14.

Figure 9:
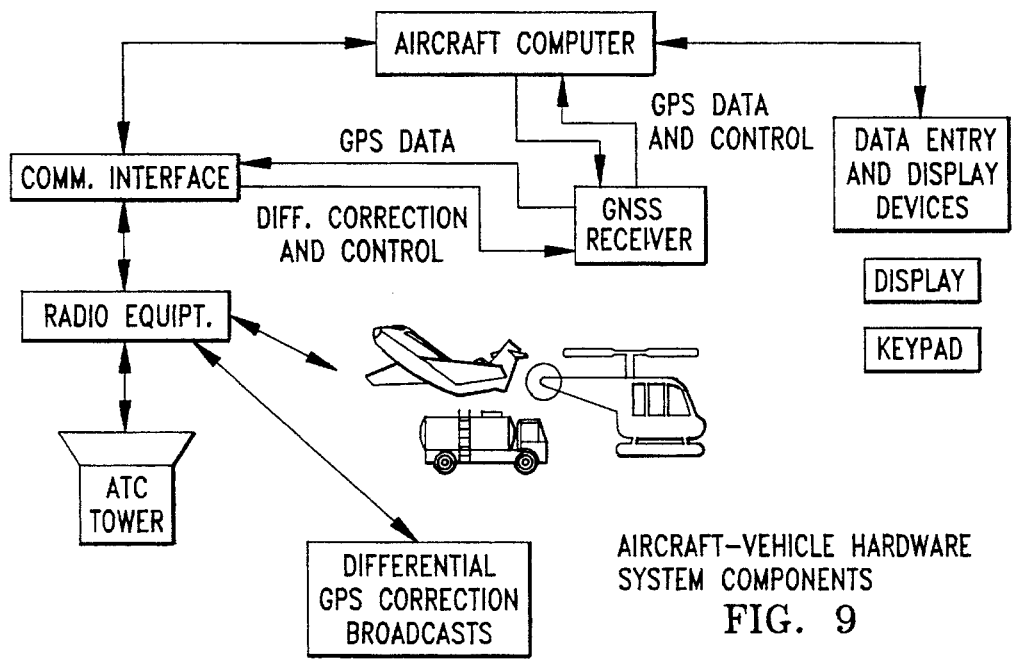

FIG. 9 shows the major hardware components of the aircraft-vehicle system. The Aircraft Computer 52 receives GNSS data from the on-board GNSS receiver 51 and, optionally, from other vehicles 48 through its radio 49 and communications interface device 50. Messages are received from the ATC Tower 47 through the same communications path. Differential correction broadcasts are received through the radio equipment 49 and communication interface 50 to the GNSS receiver 51 where they are processed internally and then passed to the Aircraft Computer 52. The operator has access to the on-board data entry and display devices 53 including, but not limited to, a keypad 55, mouse and a display screen 54.

Figure 10:
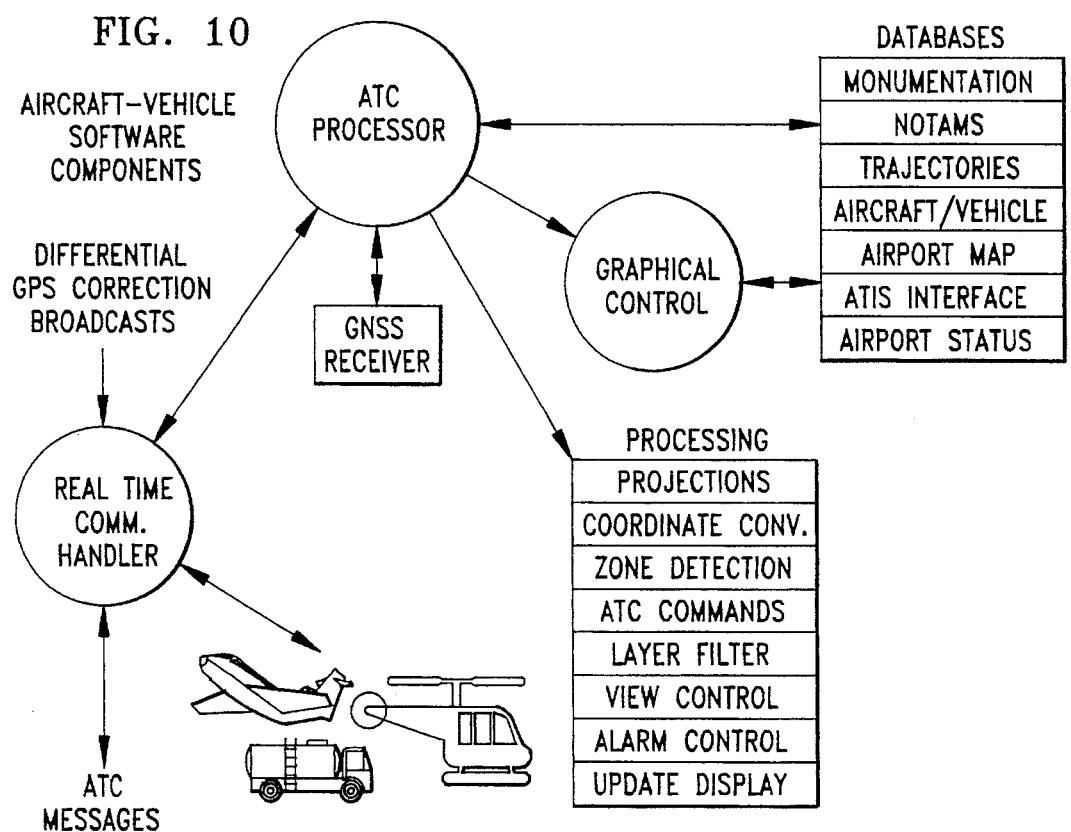

FIG. 10 shows the major software components of the aircraft-vehicle system. The GNSS signals broadcast by other vehicles 57 (optional), the differential correction broadcasts 58 and ATC messages 59 sent from the tower or remote station are processed by the Real Time Communication Handler 59 and sent to the Aircraft Processor 61. GNSS messages from the on-board GNSS receiver 60 are also received by the Aircraft Processor 61. The Aircraft Processor uses both the remote and on-board GNSS data to perform the following processing functions listed under item 62: projections, coordinate conversions, zone detection, layer filter, view control, alarm control and display updates. ATC commands are processed upon receipt from the Real Time Communication Handler 59. Display updates to the airline/vehicle screen 19 are passed from the Aircraft Processor 61 software to the Graphical Control 60 software. Both the Aircraft Processor 61 and Graphical Control 63 software use the Monumentation, NOTAMS, Trajectories, Aircraft/Vehicle, Airport Map, ATIS Interface and Airport Status data bases 64 to manipulate the presentation on the computer display screen 19.

Figure 11:
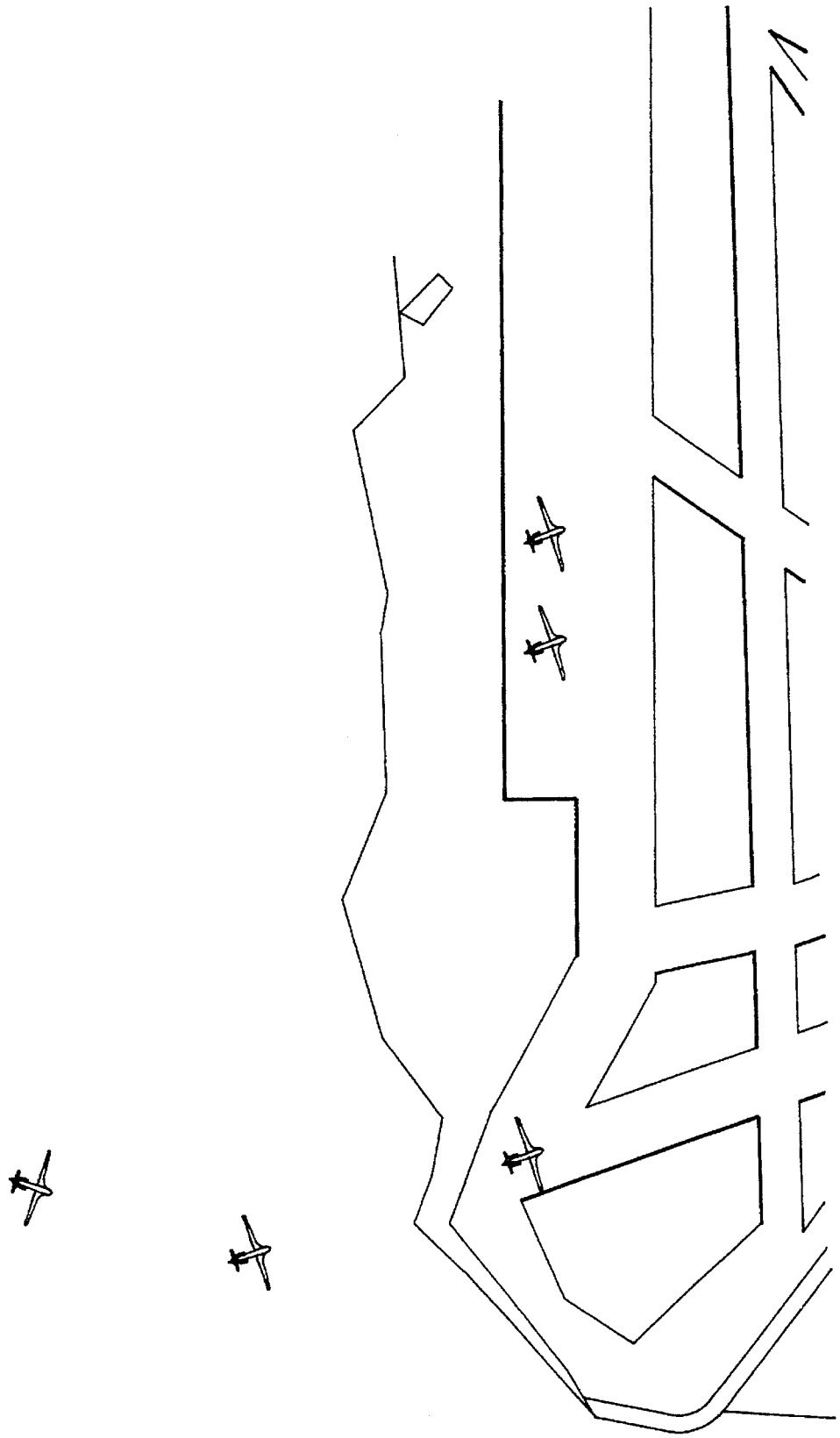
FIG. 11 shows aircraft in 3-D airport map. Aircraft are 3-D scaled representations of real aircraft. Aircraft are drawn into the map from a data base of various aircraft types.

FIG. 11 shows aircraft in 3-D airport map. Aircraft are 3-D scaled representations of real aircraft. Aircraft are drawn into the map from a data base of various aircraft types.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed and desired to secure by Letters Patent is:

1. An improved airport control/management system for controlling and managing surface and airborne movements of vehicles and aircraft operating within a selected airport space envelope, the airport control/management system comprising:

(a) means for establishing a precise 3-dimensional digital map of the selected airport space envelope, the map containing GNSS reference points, (b) a computer with a monitor screen for receiving and displaying the 3-dimensional map, (c) means located on at least one of said vehicles and aircrafts in the airport space envelope to generate and transmit continuous GNSS-based location reports, (d) a radio receiver interfaced to the computer to receive said reports from said at least one of said vehicles and aircrafts, (e) means for processing within the computer to use said reports to superimpose a 3-dimensional image corresponding to a path of said at least one of said vehicles and aircrafts on the 3-dimensional map, (f) means for using the 3-dimensional map display for generating airport control and management signals as a function of said path to control the traffic in an airport, and (g) means for manipulation of the 3-dimensional map and the 3-dimensional image of said at least one of said vehicles and aircrafts and said path to a desired apparent line of observation, to control the traffic in the airport, (h) means for layering the 3-dimensional map in at least one digital map graphical layer, (i) means for selecting for display on the monitor screen, at least one of the digital map graphical layers, (j) means for controlling the display of the 3-dimensional map and the image of said at least one of the vehicles and aircrafts based upon the digital map graphical layers, and (k) means for utilizing the graphical layers to sort and track at least one of the vehicles and aircrafts, each of the layers determined by function selected from a group of layers consisting of air traffic control responsibility, phase of flight, GNSS position, NOTAMS, zone identification, airline and airport operations.

2. In the improved airport control/management system according to claim 1 further comprising:

(a) means for defining GNSS compatible zones using the 3-dimensional map, (b) means for establishing the GNSS compatible zones, each of the GNSS compatible zones identified according to function selected from a group of zones consisting of forbidden zones, NOTAMS, areas off limits, zones around potentially colliding aircraft and vehicles, and air traffic controller areas of responsibility, and (c) means for storing the GNSS compatible zones in a GNSS compatible zone database.

3. In the improved airport control/management system according to claim 2 further comprising:

(a) means for creating a graphical symbol representing the GNSS compatible zone in at least one of the graphical layers of the 3-dimensional map, (b) means for storing the graphical symbol in the 3-dimensional map, and (c) means for displaying the graphical symbol in the 3-dimensional map as an alarm symbol when an aircraft or vehicle incurs the GNSS compatible zone.

4. In the improved airport control/management system according to claim 2 further comprising:

(a) means for incorporating a bi-directional data link to be used for GNSS based control and management of aircraft and vehicles operating within the selected airport space envelope.

5. In the improved airport control/management system according to claim 4 further comprising:

(a) means for the aircraft or vehicle to determine an identification number and a GNSS position for use in an Automatic Dependent Surveillance message, (b) means for the aircraft or vehicle to construct the Automatic Dependent Surveillance message, said message including the identification number and the GNSS position, (c) means aboard the aircraft or vehicle to broadcast the Automatic Dependent Surveillance message, (d) means for receiving the Automatic Dependent Surveillance messages at a control site and aboard similarly equipped aircraft and vehicles, (e) means to broadcast from the control site air traffic control and management signals based upon the received Automatic Dependent Surveillance messages.

6. In the improved airport control and management system according to claim 5 further comprising;

(a) means for deriving projected position information using the Automatic Dependent Surveillance message.

7. In the improved airport control and management system according to claim 6 further comprising:

(a) air traffic controller defined clearances, said clearances containing GNSS based travel path information, and (b) means for broadcasting said clearances and travel path information to the aircraft or vehicle operating within the selected airport space envelope.

8. In the improved airport control/management system according to claim 7 further comprising;

(a) means to determine off coarse deviations, said deviations calculated by comparing the projected position information with the clearances containing GNSS based travel path information, (b) means to compare the off course deviations to preset course deviation limits, (c) means to generate off course alarms should the preset course deviations exceed the limits, and (d) means to transmit the off course alarms to the aircraft and vehicles operating in the airport space envelope using the bi-directional data link, for the control and management of an airport.

9. In the improved airport control/management system according to claim 6 further comprising:

(a) means for broadcasting the GNSS compatible zones to the aircraft or vehicle operating within the selected airport space envelope.

10. In the improved airport control/management system according to claim 9 further comprising;

(a) means to detect incursion of the aircraft or vehicle into the GNSS compatible zones using the projected position information and the GNSS compatible zone database, (b) means to generate zone incursion alarms should said incursion be detected, and (c) means to broadcast the zone incursion alarms to the aircraft and vehicles operating in the airport space envelope using the bi-directional data link for the control and management of an airport.

11. In the improved control/management system according to claim 5 further comprising:

(a) means for broadcasting the Automatic Dependent Surveillance messages from aircraft and vehicles at a rate required for safe control and management of the selected airport space envelope.

12. In the improved airport control/management system according to claim 5 further comprising:

(a) means for determining aboard the aircraft or vehicle GNSS derived parameters to be used in the broadcast of the Automatic Dependent Surveillance messages the parameters comprising, three GNSS positions, determined from three precisely located antennas aboard the aircraft or vehicle and heading information, (b) means for using the three GNSS positions in combination with the heading information to accurately insert a scaled graphical symbol representing the aircraft or vehicle zone into a selected graphical layer of the 3-dimensional digital map, and (c) means for displaying the scaled graphical symbol representing the aircraft or vehicle at the proper attitude in the 3-dimensional map.

13. In the improved airport control/management system according to claim 5 further comprising:

(a) means for generating Differential GNSS corrections based upon the use of a local Differential GNSS receiver, (b) means for broadcasting Differential GNSS corrections over the bi-directional datalink to the aircraft and vehicles operating in the selected airport space envelope.

14. In the improved airport control/management system according to claim 5 further comprising:

(a) means for automatic control of radio frequency of the Automatic Dependent Surveillance message by the aircraft or vehicle as a function of aircraft or vehicle position within the selected airport space envelope.

15. In the improved airport control/management system according to claim 4 wherein said means for incorporating a radio digital data link comprises;

(a) means for digital radio transmission and reception of X.25 carrier sense multiple access (CSMA) digital communications with frequency division multiplexing (FDM), and (b) means for digital radio transmission and reception being installed into at least one aircraft or vehicle within the selected airport space envelope.

16. An improved airport control/management system for controlling and managing surface and airborne movements of vehicles and aircraft operating within a selected airport space envelope, the airport control/management system comprising:

(a) means for establishing a precise 3-dimensional digital man of the selected airport space envelope, the map containing GNSS reference points, (b) a computer with a monitor screen for receiving and displaying the 3-dimensional map, (c) means located on at least one of said vehicles and aircrafts in the airport space envelope to generate and transmit continuous GNSS-based location reports, (d) a radio receiver interfaced to the computer to receive said reports from said at least one of said vehicles and aircrafts, (e) means for processing within the computer to use said reports to superimpose a 3-dimensional image corresponding to a path of said at least one of said vehicles and aircrafts on the 3-dimensional map, (f) means for using the 3-dimensional map display for generating airport control and management signals as a function of said path to control the traffic in an airport, (g) means for manipulation of the 3-dimensional map and the 3-dimensional image of said at least one of said vehicles and aircrafts and said path to a desired apparent line of observation, to control the traffic in the airport, (h) means for defining GNSS compatible zones using the 3-dimensional map, (i) means for establishing the GNSS compatible zones, each of the GNSS compatible zones identified according to function selected from a group of zones consisting of forbidden zones, NOTAMS, areas off limits, zones around potentially colliding aircraft and vehicles, and air traffic controller areas of responsibility, and (j) means for storing the GNSS compatible zones in a GNSS compatible zone database.

17. In the improved airport control/management system according to claim 16 further comprising:

(a) means for incorporating a bi-directional data link to be used for GNSS based control and management of aircraft and vehicles operating within the selected airport space envelope.

18. In the improved airport control/management system according to claim 17 further comprising:

(a) means for the aircraft or vehicle to determine an identification number and a GNSS position for use in an Automatic Dependent Surveillance message, (b) means for the aircraft or vehicle to construct the Automatic Dependent Surveillance message, said message including the identification number and the GNSS position, (c) means aboard the aircraft or vehicle to broadcast the Automatic Dependent Surveillance message, (d) means for receiving the Automatic Dependent Surveillance messages at a control site and aboard similarly equipped aircraft and vehicles, (e) means to broadcast from the control site air traffic control and management signals based upon the received Automatic Dependent Surveillance messages.

19. In the improved airport control and management system according to claim 18 further comprising;

(a) means for deriving projected position information using the Automatic Dependent Surveillance message.

20. In the improved airport control and management system according to claim 19 further comprising:

(a) air traffic controller defined clearances, said clearances containing GNSS based travel path information, and (b) means for broadcasting said clearances and travel path information to the aircraft and vehicle operating within the selected airport space envelope.

21. In the improved airport control/management system according to claim 20 further comprising;

(a) means to determine off course deviations, said deviations calculated by comparing the projected position information with the clearances containing GNSS based travel path information, (b) means to compare the off course deviations to preset course deviation limits, (c) means to generate off course alarms should the preset course deviations exceed the limits, and (d) means to transmit the off course alarms to the aircraft and vehicles operating in the airport space envelope using the bi-directional data link, for the control and management of an airport.

22. In the improved airport control/management system according to claim 19 further comprising:

(a) means for broadcasting the GNSS compatible zones to the aircraft or vehicle operating within the selected airport space envelope.

23. In the improved airport control/management system according to claim 22 further comprising;

(a) means to detect incursion of the aircraft or vehicle into the GNSS compatible zones using the projected position information and the GNSS compatible zone database, (b) means to generate zone incursion alarms should said incursion be detected, and (c) means to broadcast the zone incursion alarms to the aircraft and vehicles operating in the airport space envelope using the hi-directional data link, for the control and management of an airport.

24. In the improved control/management system according to claim 18 further comprising;

(a) means for broadcasting the Automatic Dependent Surveillance messages from aircraft and vehicles at a rate required for safe control and management of the selected airport space envelope.

25. In the improved airport control/management system according to claim 18 further comprising:

(a) means to determining aboard the aircraft or vehicle GNSS derived parameters to be used in the broadcast of the Automatic Dependent Surveillance messages the parameters comprising, three GNSS positions, determined from three precisely located antennas aboard the aircraft or vehicle and heading information, (b) means for using the three GNSS positions in combination with the heading to accurately insert a scaled graphical symbol representing the aircraft or vehicle zone into the 3-dimensional digital map, and (c) means for displaying the scaled graphical symbol representing the aircraft or vehicle at the proper attitude in the 3-dimensional map.

26. In the improved airport control/management system according to claim 18 further comprising:

(a) means for generating Differential GNSS corrections based upon the use of a local Differential GNSS receiver, (b) means for broadcasting Differential GNSS corrections over the bi-directional datalink to the aircraft and vehicles operating in the selected airport space envelope.

27. In the improved airport control/management system according to claim 18 further comprising:

(a) means for automatic control of radio frequency of the Automatic Dependent Surveillance message by the aircraft or vehicle as a function of the aircraft or vehicle GNSS position within the selected airport space envelope.

28. In the improved airport control/management system according to claim 17 wherein said means for incorporating a radio digital data link comprises;

(a) means for digital radio transmission and reception of X.25 carrier sense multiple access (CSMA) digital communications with frequency division multiplexing (FDM), and (b) means for digital radio transmission and reception being installed into at least one aircraft or vehicle within the selected airport space envelope.

29. An improved airport control/management system for controlling and managing surface and airborne movements of vehicles and aircraft operating within a selected airport space envelope, the airport control/management system comprising:

(a) means for establishing a precise 3-dimensional digital map of the selected airport space envelope, the map containing GNSS reference points, (b) a computer with a monitor screen for receiving and displaying the 3-dimensional map, (c) means located on at least one of said vehicles and aircrafts in the airport space envelope to generate and transmit continuous GNSS-based location reports, (d) a radio receiver interfaced to the computer to receive said reports from said at least one of said vehicles and aircrafts, (e) means for processing within the computer to use said reports to superimpose a 3-dimensional image corresponding to a path of said at least one of said vehicles and aircrafts on the 3-dimensional (f) means for using the 3-dimensional map display for generating airport control and management signals as a function of said path to control the traffic in an airport, (g) means for manipulation of the 3-dimensional map and the 3-dimensional image of said at least one of said vehicles and aircrafts and said path to a desired apparent line of observation, to control the traffic in the airport;

(h) means for establishing precise multi-monumented survey points within the airport space envelope, and (i) means for performing local coordinate conversions using said survey points to support display of the 3-dimensional image corresponding to the vehicle path on to the 3-dimensional map.

30. A method used by a controller to monitor, control and manage vehicles including surface and airborne vehicles operating in a selected 3-dimensional space, the method combing the steps of:

(a) using GNSS, derived data based upon an earth centered earth fixed coordinate system, establishing a precise 3-dimensional digital map of the selected 3-dimensional space, in combination with at least one GNSS-compatible database;

(b) receiving GNSS position reports data from the vehicles within the selected 3-dimensional space and storing the GNSS position reports data in the GNSS-compatible databases, at least one of the vehicles having a means to receive GNSS signals and determine GNSS position, generate and transmit, by digital data, continuous GNSS-based position reports, and identification data to the controller;

(c) processing data received from the vehicles with the 3-dimensional digital map of the selected 3-dimensional space and the GNSS-compatible database creating a displayable map showing location and movement of at least one of the vehicles within the selected 3-dimensional space;

(d) providing to the controller, based on the processed data, commands for communication to at least one of the vehicles thereby monitoring, controlling and managing the movements of at least one of the vehicles within the selected 3-dimensional space;

(e) identifying GNSS compatible zones of interest within the selected 3-dimensional space, (f) creating a 3-dimensional digital map of the GNSS compatible zones and the selected 3-dimensional space, (g) establishing at least a map and zone database compatible with computer processing, the map and said zone database maintaining the GNSS compatible zones and the 3-dimensional digital map coordinate information, (h) processing data received from the vehicles with the map and the zone database creating a displayable map showing location and movement of the vehicles with respect to the 3-dimensional digital map of the GNSS compatible zones and the selected 3-dimensional space, (i) identifying potential for incursion of the vehicles into any of the GNSS compatible zones, the potential for incursion determined from the processed data received from the vehicles and criteria selected from the group consisting of NOTAMS, areas off limits, zones around potentially colliding vehicles, air traffic controller stations, and (j) generating control and management signals as a function of the vehicle path and the potential for incursion into zones to assist the controller to monitor, control and manage said selected 3-dimensional space.

31. The method used by a controller to monitor, control and manage vehicles according to claim 30 further comprising the steps of:

(a) deriving velocity data from the GNSS-position reports data, (b) computing projected path and destination information using the velocity data of the vehicles within the selected 3-dimensional space, (c) generating alarms based upon encroachment by the vehicles of the GNSS compatible zones, and (d) broadcasting to the vehicles the alarm condition.

32. The method used by a controller to monitor, control and manage vehicles according to claim 31 further comprising the steps of:

(a) determining vehicle attitude using GNSS position coordinates;

(b) characterizing vehicle shape; and (c) displaying the attitude and shape and the location of the vehicle in 3-dimensions on the screen in combination with the displayable map of the selected 3-dimensional space.

33. The method used by a controller to monitor, control and manage vehicles according to claim 31 further comprising the steps of:

(a) generating controller defined GNSS based clearances, said clearances containing GNSS based travel path information, (b) broadcasting said clearances and GNSS based travel path information to the vehicles operating within the selected 3-dimensional space.

34. The method used by a controller to monitor, control and manage vehicles according to claim 33 further comprising the steps of:

(a) determining off course deviations, said deviations determined by comparing the projected position information with the clearances containing GNSS based travel path information, (b) comparing the off course deviations to preset course deviation limits, (c) generating alarms should the preset course deviations exceed the limits, and (d) transmitting the alarms to the vehicles operating in the selected 3-dimensional space.

35. A method used by a controller to monitor, control and manage vehicles including surface and airborne vehicles operating in a selected 3-dimensional space, the method comprising the steps of:

(a) using GNSS, derived dam based upon an earth centered earth fixed coordinate system, establishing a precise 3-dimensional digital map of the selected 3-dimensional space, in combination with at least one GNSS-compatible database;

(b) receiving GNSS position reports data from the vehicles within the selected 3-dimensional space and storing the GNSS position reports data in the GNSS-compatible databases, at least one of the vehicles having a means to receive GNSS signals and determine GNSS position, generate and transmit, by digital data, continuous GNSS-based position reports, and identification data to the controller;

(c) processing data received from the vehicles with the 3-dimensional digital map of the selected 3-dimensional space and the GNSS-compatible database creating a displayable map showing location and movement of each vehicle within the selected 3-dimensional space;

(d) providing to the controller, based on the processed data, commands for communication to at least one of the vehicles thereby monitoring, controlling and managing the movements of at least one of the vehicles within the selected 3-dimensional space; and (e) layering the 3-dimensional map creating a layered map having at least one layer, the layering thereby permitting sorting and tracking of each at least one of the vehicles, the layers selected from the group determined by function consisting of traffic control phase, notams, forbidden zone identification, the selected and defined 3-dimensional space operations, vehicle identification, airline operations and airport operations.

36. The method used by a controller to monitor, control and manage vehicles according to claim 35 further comprising the steps of:

(a) identifying GNSS compatible zones of interest within the selected 3-dimensional space based upon the earth centered earth fixed coordinate system, (b) creating a 3-dimensional digital map of the GNSS compatible zones and the selected 3-dimensional space (c) establishing at least a map and zone database compatible with computer processing, the map and said zone database maintaining the GNSS compatible zones and the 3-dimensional digital map coordinate information, (d) processing data received from the vehicles with the map and the zone database creating a displayable map showing location and movement of the vehicles with respect to the 3-dimensional digital map of the GNSS compatible zones and the selected 3-dimensional space, (e) identifying potential for incursion of the vehicles into any of the GNSS compatible zones, the potential for incursion determined from the processed data received from the vehicles and criteria selected from the group consisting of NOTAMS, areas off limits, zones around potentially colliding vehicles, air traffic controller stations, and (f) generating control and management signals as a function of the vehicle path and the potential for incursion into zones to assist the controller to monitor, control and manage.

37. The method used by a controller to monitor, control and manage vehicles according to claim 36 further comprising the steps of:

(a) deriving velocity data from the GNSS-position reports data, (b) computing projected path and destination information using the velocity data of the vehicles within the selected 3-dimensional space, (c) generating alarms based upon encroachment by the vehicles of the GNSS compatible zones, and (d) broadcasting to the vehicles the alarm condition.

38. The method used by a controller to monitor, control and manage vehicles according to claim 37 further comprising (a) determining vehicle attitude using GNSS position coordinates;

(b) characterizing vehicle shape; and (c) displaying the attitude and shape and the location of the vehicle in 3- dimensions on the screen in combination with the displayable map of the selected 3-dimensional space.

39. The method used by a controller to monitor, control and manage vehicles according to claim 37 further comprising the steps of:

(a) generating controller defined GNSS based clearances, said clearances containing GNSS based travel path information, (b) broadcasting said clearances and GNSS based travel path information to the vehicles operating within the selected 3-dimensional space.

40. The method used by a controller to monitor, control and manage vehicles according to claim 39 further comprising the steps of:

(a) determining off course deviations, said deviations determined by comparing the projected position information with the clearances containing GNSS based travel path information, (b) comparing the off course deviations to preset course deviation limits, (c) generating alarms should the preset course deviations exceed the limits, and (d) transmitting the alarms to the vehicles operating in the selected 3-dimensional space.

41. A system based within at least one vehicle/aircraft for controlling and managing the vehicle's/aircraft's movement within a defined and selected airport space envelope of an airport, said system comprising:

means for adopting a common coordinate reference for each said at least one vehicle/aircraft, said common coordinate reference being GNSS compatible;

a GNSS receiver on said at least one vehicle/aircraft to receive GNSS signals and calculate GNSS based position data;

a computer interfacing with said GNSS receiver and said position data;

means for identification of forbidden zones within said defined and selected airport space envelope of an airport, said zones selected from the group determined by function consisting of notams, areas off limits, and zones around potentially colliding vehicles/aircraft; and means for generating warnings using said computer, based upon encroachment by the vehicle/aircraft of said forbidden zones where said encroachment is determined using said position data and said identified forbidden zones.

42. The system based within at least one vehicle/aircraft according to claim 41 further comprising:

bi-directional radio equipment interfacing with the computer;

means associated with the radio equipment to receive digital data, the digital data selected from databases in the group of databases consisting of GNSS-based reports from at least one other vehicle/aircraft, air traffic control commands, and differential corrections; and means within each vehicle/aircraft to transmit GNSS-based reports to the other vehicles/aircraft.

43. The system based within at least one vehicle/aircraft according to claim 42 further comprising:

means for establishing and displaying a 3-dimensional map of the selected airport space envelope, the map containing GNSS positioning system reference points;

means for continuously superimposing an image of the vehicle's/aircraft's position and path onto the map.

44. The system based within at least one vehicle/aircraft according to claim 43 further comprising:

means associated with the vehicles'/aircraft's computer and using GNSS data received from at least one other vehicle/aircraft to superimpose the other vehicle's/aircraft's image, position and path onto the map.

45. The system based within at least one vehicle/aircraft according to claim 41 further comprising:

means for establishing and displaying a 3-dimensional map of the selected airport space envelope, the map containing GNSS positioning system reference points;

means for continuously superimposing an image of the vehicle's/aircraft's position and path onto the map.

\* \* \* \* \*